United States Patent
Schlosser et al.

[19]

[11] Patent Number: 6,067,978
[45] Date of Patent: May 30, 2000

[54] OUTDOOR COOKING APPARATUS WITH IMPROVED AUXILIARY GAS BURNER

[76] Inventors: Erich J. Schlosser, 25596 W. Chatham Rd., Barrington, Ill. 60010; Mohammed Shoeb, 4 Birchwood Ct., Streamwood, Ill. 60107; Horst Uwe Harneit, 1466 West Francis, P.O. Box 228, Ontario, Calif. 91762

[21] Appl. No.: 08/908,408

[22] Filed: Aug. 7, 1997

[51] Int. Cl.[7] ........................................ A47J 37/00
[52] U.S. Cl. .................. 126/41 R; 126/39 R; 126/39 E; 431/264; 431/354
[58] Field of Search ............................. 126/41 R, 39 R, 126/39 E, 39 N, 39 G; 431/264–268, 350, 353, 354

[56] References Cited

U.S. PATENT DOCUMENTS

| | | |
|---|---|---|
| 3,799,142 | 3/1974 | Jensen . |
| 3,830,216 | 8/1974 | Dodd . |
| 3,922,138 | 11/1975 | Biddle et al. . |
| 4,130,104 | 12/1978 | Kristen et al. . |
| 4,518,346 | 5/1985 | Pistien . |
| 4,541,407 | 9/1985 | Sommers et al. . |
| 4,773,383 | 9/1988 | Le Monnier de Gouville et al. . |
| 4,810,188 | 3/1989 | Kwiatek . |
| 4,846,671 | 7/1989 | Kwiatek . |
| 4,891,006 | 1/1990 | Le Monnier de Gouville et al. . |
| 4,953,534 | 9/1990 | de Gouville et al. . |
| 5,002,038 | 3/1991 | Riehl . |
| 5,040,970 | 8/1991 | Riehl . |
| 5,052,920 | 10/1991 | Warren et al. . |
| 5,083,915 | 1/1992 | Riehl . |
| 5,085,202 | 2/1992 | Riehl . |
| 5,112,218 | 5/1992 | Sigler . |
| 5,118,285 | 6/1992 | Le Monnier de Gouville et al. . |
| 5,125,390 | 6/1992 | Riehl . |
| 5,133,334 | 7/1992 | Riehl . |
| 5,149,262 | 9/1992 | Riehl . |
| 5,152,276 | 10/1992 | Brock et al. . |
| 5,160,255 | 11/1992 | Sigler . |
| 5,160,256 | 11/1992 | Riehl . |
| 5,186,158 | 2/1993 | Ferlin . |
| 5,203,317 | 4/1993 | James ........................... 126/41 R |
| 5,266,026 | 11/1993 | Riehl . |
| 5,277,576 | 1/1994 | Hartung et al. . |
| 5,328,357 | 7/1994 | Riehl . |
| 5,328,358 | 7/1994 | Riehl . |
| 5,397,234 | 3/1995 | Kwiatek . |
| 5,443,380 | 8/1995 | Riehl . |
| 5,464,345 | 11/1995 | Kwiatek . |
| 5,468,145 | 11/1995 | Ferlin . |

FOREIGN PATENT DOCUMENTS

| | | |
|---|---|---|
| 1315505 | 2/1962 | France . |
| 2408-096 | 6/1979 | France . |
| 805068 | 5/1951 | Germany ..................... 126/39 R |

OTHER PUBLICATIONS

American National Standard/Canadian Gas Association Standard for Outdoor Cooking Gas Appliances, 1995.

*Primary Examiner*—James C. Yeung
*Attorney, Agent, or Firm*—Wallenstein & Wagner, Ltd.

[57] ABSTRACT

A barbecue grill comprising a grilling housing, and a gas burner mounted adjacent the grilling housing. The gas burner includes a burner base having a base chamber, a burner head having at least one air and fuel mixture exit port, and a venturi having opposed relatively open ends, the venturi providing a passage between the burner base and the burner head. The base chamber surrounds one of the opposed relatively open ends of the venturi and the base chamber has an inner wall which reduces from a wider portion to a narrower portion with a fuel inlet providing access for fuel into the base chamber and a combustion air inlet being disposed about at least a portion of a periphery of the wider portion of the base chamber. The burner further including a means for securing the burner head to the burner base such that the burner head may be lifted off the burner base for inspection and cleaning of the burner base.

59 Claims, 5 Drawing Sheets

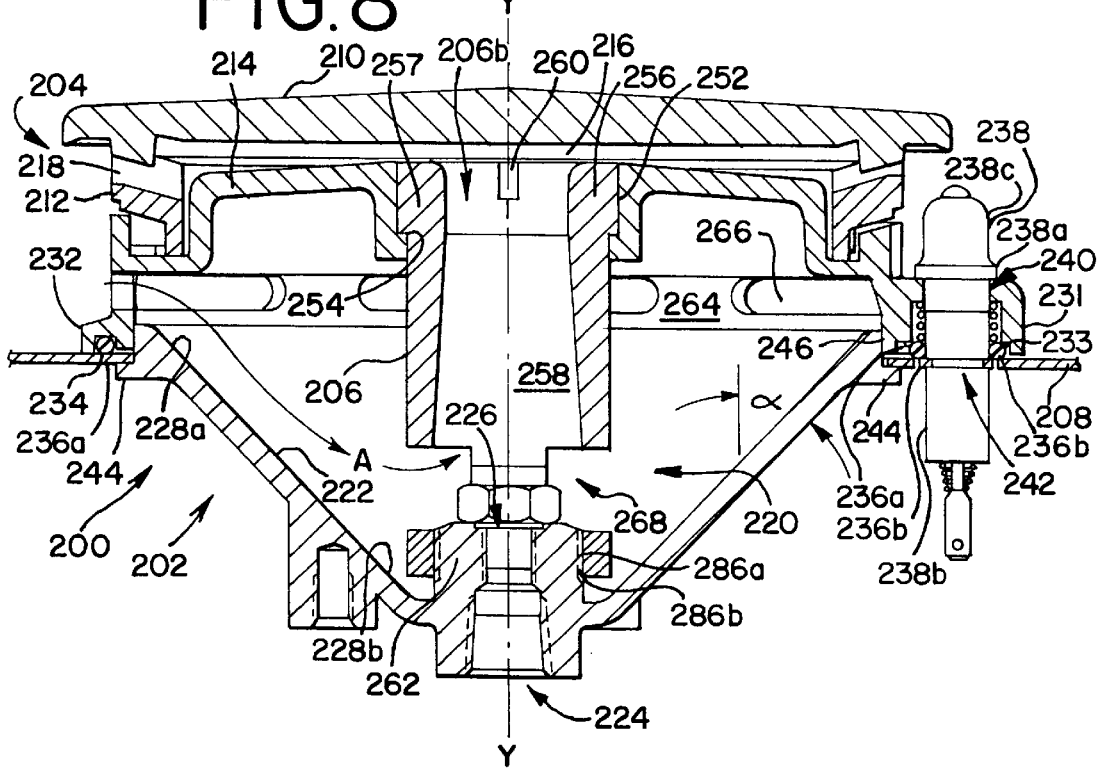
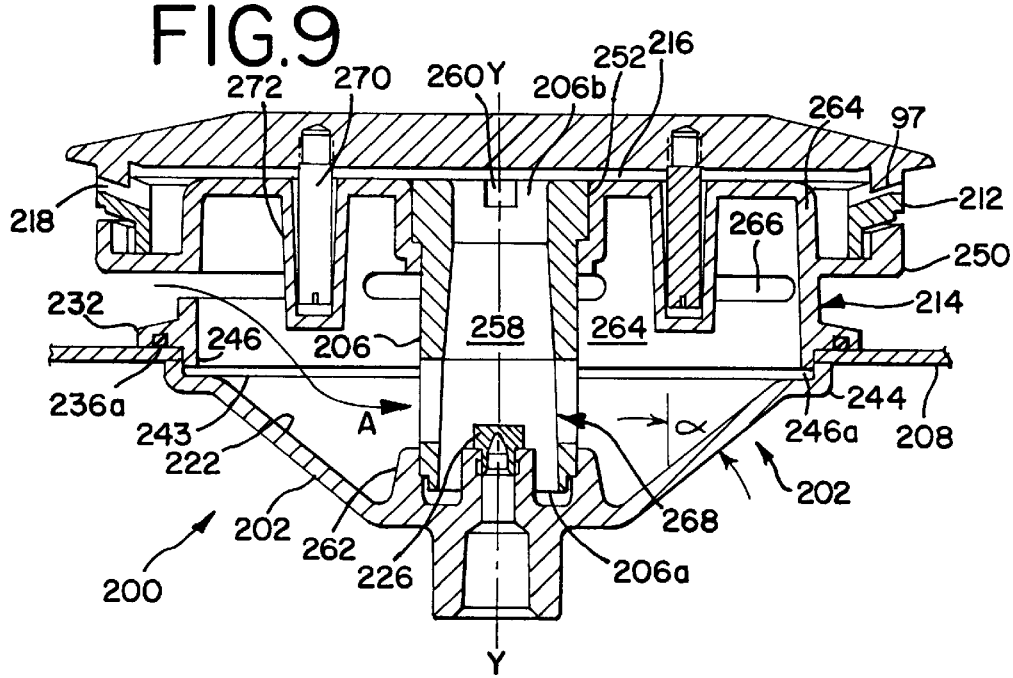

OUTDOOR COOKING APPARATUS WITH IMPROVED AUXILIARY GAS BURNER

DESCRIPTION

1. Technical Field

The present invention relates to gas burners and barbecue grills equipped with work-top or mountingtop gas burners which supplement the main grilling chamber or housing.

2. Background of the Invention

Outdoor cooking apparatus, such as gas barbecue grills, can require design criteria different than cooking apparatus designed for indoor use. For example, during periods of non-use, barbecue grills are exposed to weather, blowing dust, debris and insects. These elements can seriously affect the performance of gas-fueled burners. Furthermore, during use, wind and precipitation can seriously affect flame performance in gas-fueled burners, as the flow of air/fuel mixture may not be sufficiently robust enough to avoid partial or total extinguishment of the flame.

Conventional gas burners for outdoor applications are designed such that the primary combustion air intake occurs up-stream of the gaseous fuel inlet, where the gas orifice is located. In general, the opening or openings through which primary air enters the combustion chamber allows insects, mostly spiders, to crawl into the gas mixing chambers. This can lead to either partially or completely closing the gas orifice and obstructing flow in the gas mixing chamber. The combination of dust, debris and insects which clog up the gas orifice or gas mixing chamber make it necessary for the user to periodically clean these areas. However, when a conventional gas burner is mounted to a work or mounting surface of a barbecue grill, the combustion air intake is accessible only from underneath the mounting-top surface. This makes it extremely inconvenient for the user to clean these areas.

To avoid this, "spider guards" have conventionally been placed over the primary air intake openings. These spider guards have had some degree of success, but do not completely prevent spiders and other insects from entering through the fuel and air mixture exit ports in the burner head. Furthermore, the addition of "spider guards" provides an additional surface for debris to accumulate. Ultimately, cleaning of the gas orifice and gas mixing chamber is still required.

In addition, the cleaning procedure for this type of burner system to remove insects, spider webs and accumulated dust and dirt is relatively involved. The user is either forced to access the burner from below the mounting surface or, with some designs, one may be required to detach the entire burner from its mounting on the mounting-top for cleaning.

Another limitation of conventional burners is that the amount of combustion air provided to the burner must be adjusted when switching the type of gaseous fuel used; for example, propane versus natural gas. Also, during certain windy conditions, an adjustment to the combustion air intake is sometimes desired or necessary in order to achieve maximum performance of the burner. These adjustments are normally accomplished by adjusting the size of the opening or openings for the intake of combustion air. However, since these openings are mounted beneath the mounting surface on conventional burners, this adds to the inconvenience of having to make the adjustment.

While there are some burners which provide access to external parts of the burners by removing upper components thereof, most of these burners are not likely to provide sufficient structural stability when mounted to a barbecue with wheels. Such grills are occasionally moved over rough surfaces, such as lawns or spaced-deck boards. The lift-off components of these conventional burners in such instances may become partially or totally dislodged, resulting in an unacceptable condition.

Another problem unique to outdoor gas grills with conventional side burners is the potential for strong winds which blow the primary flame back into the air/fuel mixing chamber. This could cause melting of interior burner parts should they be manufactured out of aluminum.

SUMMARY OF THE INVENTION

The present invention remedies the above-mentioned deficiencies in the art and provides additional structural and functional benefits in outdoor cooking apparatus, such as a barbecue grill with an auxiliary or work-top gas burner (hereinafter referred to as "gas burner" or "burner") mounted to a mounting or work surface on the barbecue grill.

One embodiment of the invention provides a barbecue grill having a grill housing and a work-top gas burner mounted adjacent the housing on a mounting surface. According to one aspect of the invention, the gas burner is designed and mounted such that its primary combustion air intake is located above the mounting surface, which surface is preferably a work-top of the barbecue grill.

According to another aspect of the invention, the burner includes a fuel inlet, air and fuel mixture exit ports, and a venturi having opposed relatively open ends. The venturi provides a passage between the fuel inlet and the air and fuel mixture exit ports. A base chamber surrounds one of the open ends of the venturi. The chamber has an inner wall which reduces from a wider portion to a narrower portion. The fuel inlet provides access for fuel into the chamber. A combustion air inlet is disposed about a periphery of the chamber, at or near the wider portion of the chamber, and is located such that incoming air at least initially flows into the base chamber in a direction from the wider portion of the chamber toward a narrower portion of the chamber.

In a preferred embodiment of the present invention, first and second peripheral flanges are provided. The first peripheral flange extends circumferentially outwardly from and below the air and fuel mixture exit ports, but above the combustion air inlet. The second peripheral flange extends outwardly from the wider portion of the base chamber below the combustion air inlet. The second flange has an outside diameter which is greater than the diameter of a mounting hole in the work surface of the grill, thereby allowing the burner to be easily mounted to the top of the work surface.

The first and second peripheral flanges are cooperatively located and spaced from each other such that air for combustion flows between the two flanges and into the combustion air inlet. Among other things, the first flange assists in preventing liquid spills from entering the air/fuel mixing chamber. Preferably, the second flange has a thickness dimension which spaces the combustion air inlet to a distance above the mounting surface. This prevents liquids on the mounting surface from flowing into the combustion air inlet. According to another aspect of the present invention, an igniter may be mounted on the second flange and extend through an opening in the first flange, such as to be exposed to the air and fuel mixture exit ports.

Preferably the wider portion of the base chamber is disposed upwardly relative to the narrower portion of the chamber. It is also preferable, according to the embodiments currently tested, that the base chamber be substantially frustoconical in shape; although it is also contemplated that the inner wall of the chamber could be either convex away from a center of the chamber or concave toward a center of the chamber to define other narrowing chambers.

The fuel inlet is preferably joined to the inner wall of the burner base by an arcuate annular wall portion to reduce turbulence and is located at a narrower portion of the chamber.

According to another aspect of the invention, a burner head consisting of a cap, a burner head base plate and a head chamber within the burner head is positioned on the burner base. A means for securing the burner head to the burner base is provided, such that the burner head may be simply lifted off of the burner base for inspection and cleaning of the burner base and the base chamber. With this design, it is not necessary to access the burner from below the mounting surface.

The burner is designed such that individual parts of the burner will not get dislodged and move out of position when, for example, the grill is being moved on an uneven surface, as required by ANSI Z21.58 (1995), or Canadian CGA 1.6 M95 Standard 2.7.1 ("hereafter ANSI shake test"). A preferred embodiment provides protrusions extending from one of either the burner head base plate or the burner base. Receptacles on the other of the burner head base plate or burner base are provided for receiving the protrusions. The protrusions and receptacles are cooperatively dimensioned such that the burner head may be lifted off of the burner base, but also such that the burner head will not separate from the burner base when undergoing the ANSI shake test for portable outdoor gas grills.

According to another aspect of the invention, the burner includes a head chamber within the burner head. The burner head has means for securing the cap to the burner head base plate such that the cap may be lifted off the burner head base plate for inspection and cleaning of the head chamber. Preferably, protrusions are provided, extending from one of either the burner head base plate or the cap, and receptacles are provided on the other of the burner head base plate or cap for receiving the protrusions. Again, each of the protrusions and receptacles are cooperatively dimensioned such that the burner cap may be lifted off the burner head base plate in a substantially vertical direction, but also such that the burner cap will not separate from the burner head when undergoing the ANSI shake test for portable outdoor gas grills.

According to another aspect of invention, the head chamber is comprised of an upper extent defined by a lower surface of the cap, and a lower extent which is defined in part by an upper surface of the burner head base plate. A removable ring is interposed between the cap and the burner head base plate to define a circumferential side wall of the chamber. The ring has means for permitting a fuel and air mixture to exit through the ring and out of the base channel to provide a primary heating flame. The ring further has means for permitting a sufficient flow of fuel and air mixture to flow under the ring to provide a pilot flame, which assures even burning of the cooking flame and resistance to partial or total extinguishment of the cooking flame under windy conditions.

According to another embodiment of the present invention, a sealable gas burner provides a means for preventing fluid from entering around an opening provided for mounting the burner and seeping below the mounting surface. The means for maintaining the sealed condition includes an external collar of the burner head, an annular recess within the external collar disposed adjacent the mounting surface, a gasket and a means for maintaining a force between the burner head and the mounting surface to compress the gasket. The gasket is positioned within the annular recess of the collar, so as to seal the burner head from the mounting surface.

The means for securing the burner head to the burner base, and thereby providing a force to maintain a sealed condition between the burner head and the mounting surface, includes an opening in the burner head base plate, a venturi which fits into the opening and is captured therein, and a means for securing the venturi to the burner base. One means for securing the venturi to the burner base includes a projection which extends into the chamber from substantially the center of the burner base and a venturi. The projection and venturi may include internal threads and mating external threads for connecting the venturi to the projection of the burner base. Similarly, the projection and venturi may employ a bayonet lock.

Other advantages and aspects of the present invention will become apparent upon reading the following description of preferred embodiments constructed in accordance with the drawings and detailed description of the invention.

BRIEF DESCRIPTION OF THE DRAWINGS

FIG. 8 is a cross-sectional side view of a gas burner, according to an alternate embodiment of the invention;

FIG. 9 is a cross-sectional side view of a gas burner, according to another alternate embodiment of the invention; and, FIGS. 10 and 11 are fragmentary cross-sectional views of a gas burner with alternate means for securing a burner head to a burner base and providing alternate shapes for the inner wall of the air/fuel mixing chamber.

DETAILED DESCRIPTION OF THE PREFERRED EMBODIMENT

Figure 1:
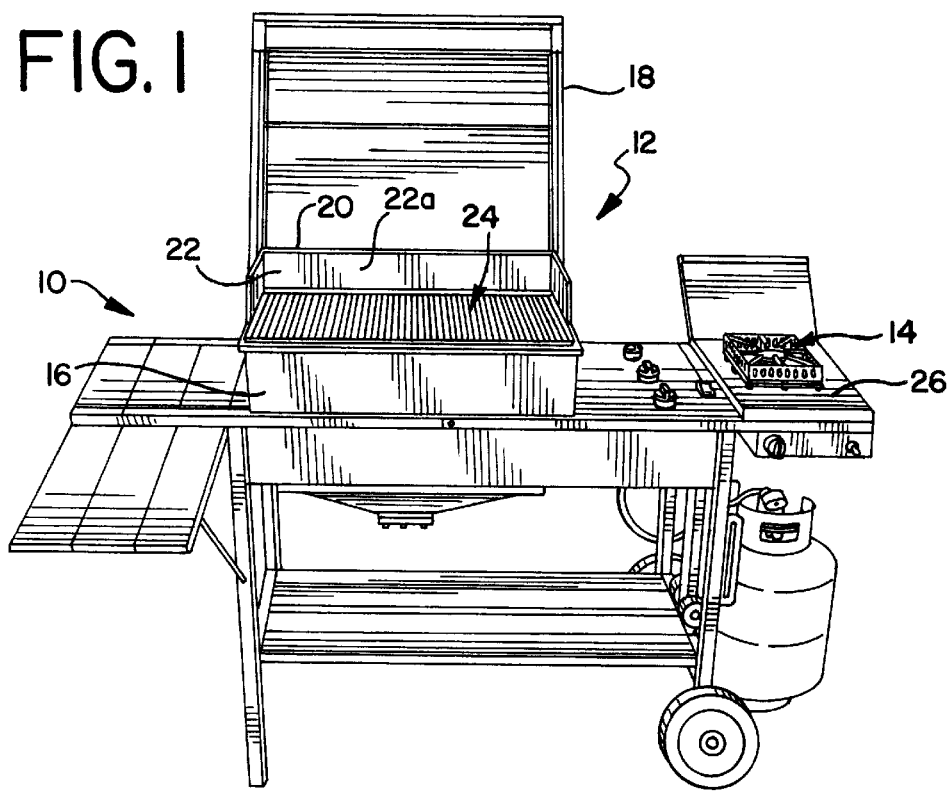
FIG. 1 is a perspective view of an outdoor grill with a gas side burner constructed in accordance with the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIRST EMBODIMENT

FIG. 1 discloses an improved barbecue grill 10 according to the present invention. The improved barbecue grill 10 includes a grilling housing 12 and an improved auxiliary work-top gas burner 14. The grilling housing 12 consists of a lower portion 16 and a cover 18. The cover 18 is secured to the lower portion 16 by a hinge 20 connected to an upper edge 22a of a rear sidewall 22 of the lower portion 16. The lower portion 16 contains a cooking grid 24 and a burner assembly (not shown) located in the interior thereof. It should be appreciated that the present invention may be used with any outdoor cooking apparatus, regardless of the configuration of the grill portion or even if there is no grilling portion of the apparatus.

Figure 2:
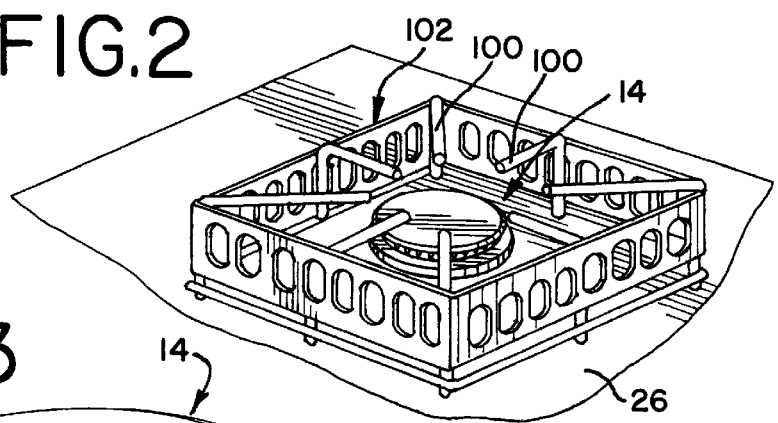
FIG. 2 is a fragmentary perspective view of the gas burner of FIG. 1, as mounted on a work surface of the outdoor grill.
Figure 3:
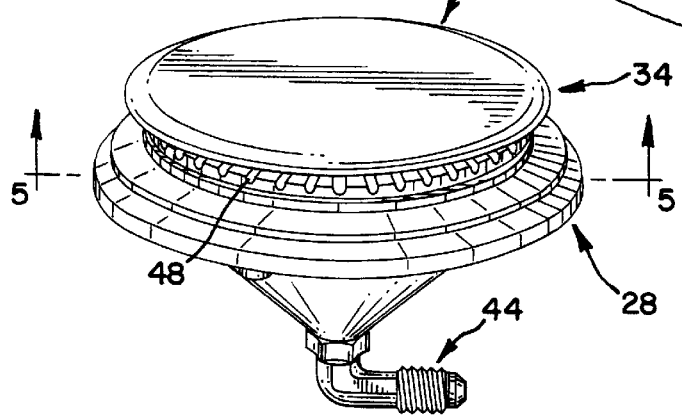
FIG. 3 is a perspective view of the gas burner, shown apart from the grill of FIG. 1.

As shown in FIGS. 1 and 2, the gas burner 14 is mounted to a mounting surface 26 adjacent the grilling housing 12. As disclosed in FIGS. 3, 4 and 5, the burner 14 is comprised of a burner base 28 and a burner head 34. The burner base 28 has a base chamber 30 which reduces from a wider portion 32a to a narrower portion 32b. The burner head 34 has a head chamber 36. A means for securing the burner head 34 to the burner base 28 is provided, such that the burner head 34 may be lifted off the burner base 28 for access to the base chamber 30 for inspection and cleaning thereof.

Figure 4:
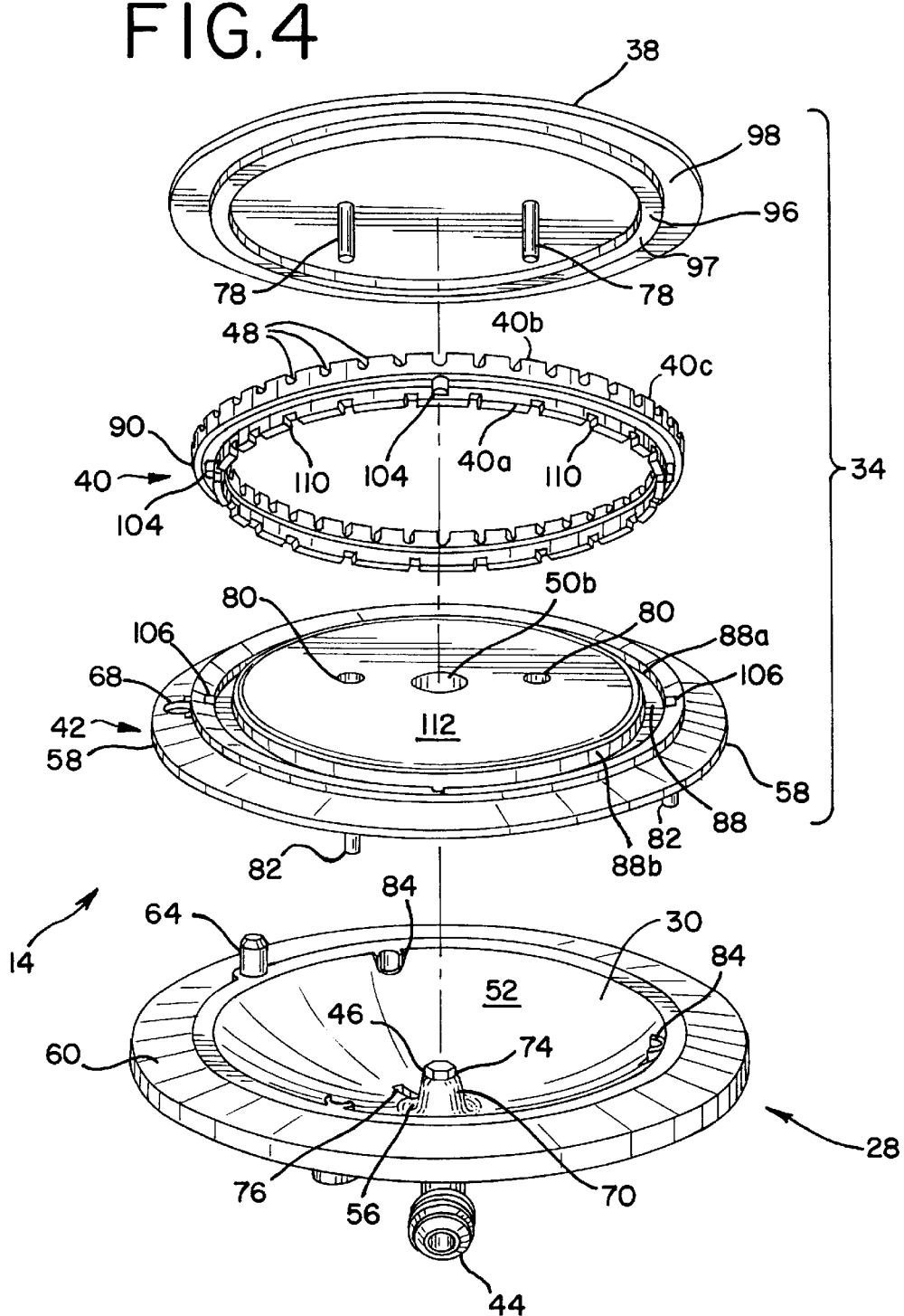
FIG. 4 is an exploded view of the gas burner of FIG. 3.
Figure 5:
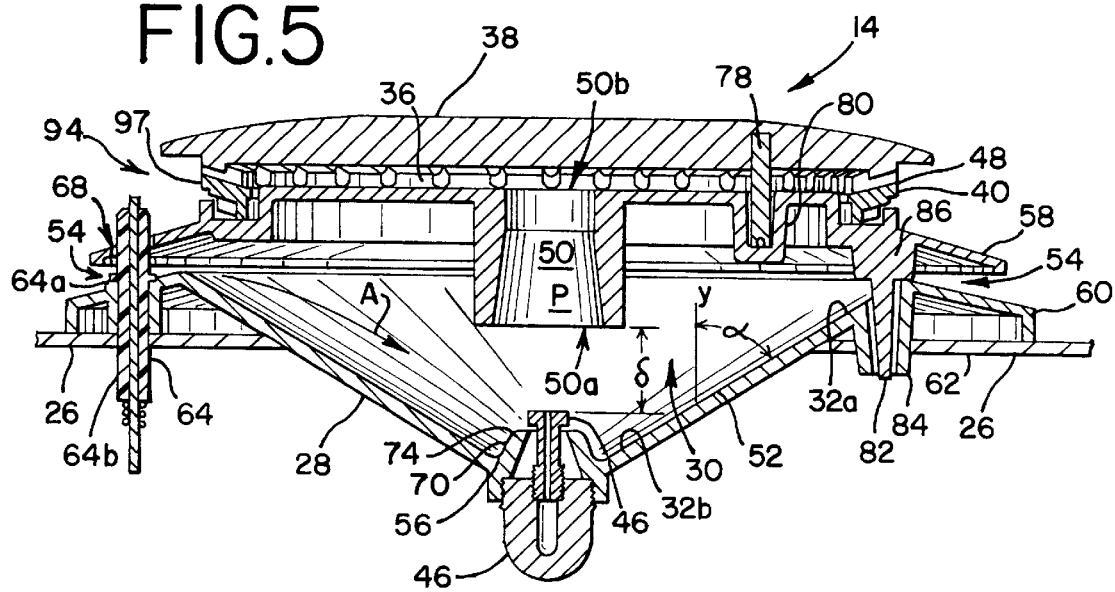
FIG. 5 is a cross-sectional view of the gas burner of FIG. 3, taken along line 5—5 of FIG. 3.

As shown in FIGS. 4 and 5, the burner 14 also includes a burner cap 38, a removable ring 40, a burner head base plate 42, a fuel inlet 44, an orifice 46, air/fuel mixture exit ports 48 and a venturi 50 have opposed relatively open ends 50a,50b. An inner wall 52 of the base chamber 30 surrounds one of the open ends 50a of the venturi 50. A combustion air inlet 54 is disposed about a periphery of the base chamber 30. As will be disclosed in detail below, a means is provided for securing the cap 38 to the burner head base plate 42 such that the cap 38 may be lifted off of the burner head base plate 42 for access to the head chamber 36. The exit ports 48 provide a means for permitting a mixture of air and fuel to exit from the burner 14 to provide a primary heating flame.

Figure 10:
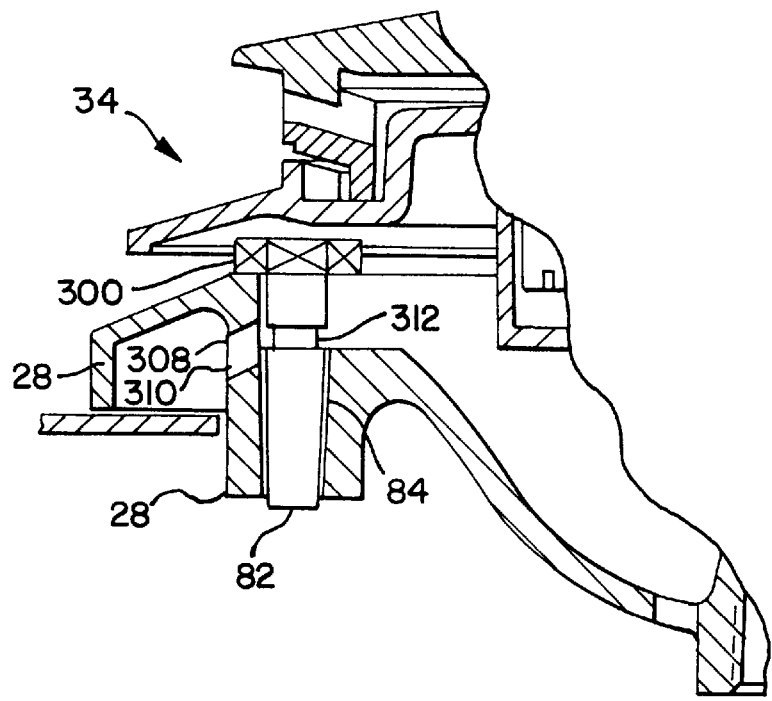
Figure 11:
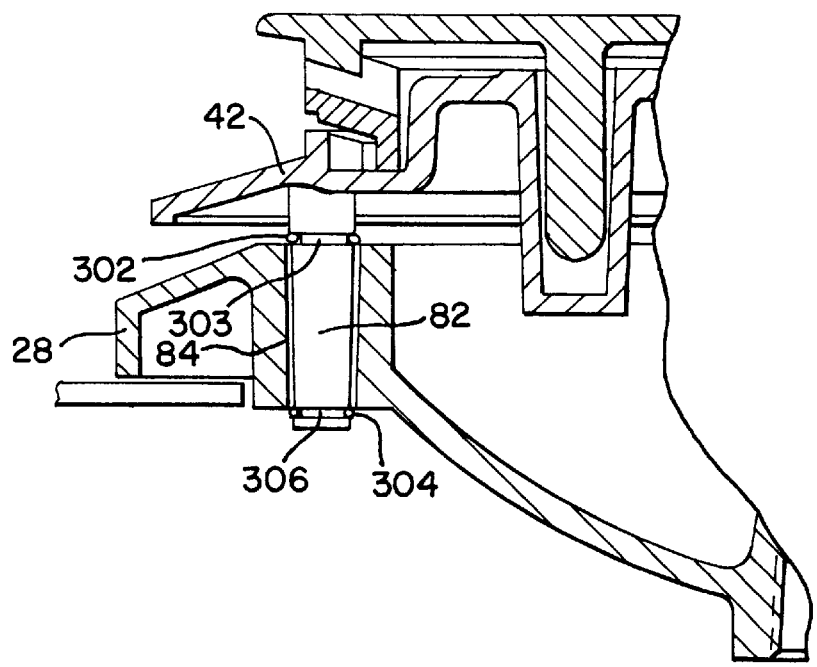

The base chamber 30 is substantially frustoconical in shape, as seen in FIG. 5, although it is contemplated that it could also be concave or convex as disclosed in the alternate embodiments of FIGS. 10 and 11. FIG. 5 further discloses that the burner base 28 has an inner wall 52 which preferably defines an angle α to the vertical (referenced by line Y—Y of FIG. 5) to define a portion of base chamber 30. Preferably, the angle α is approximately 80° or less, however, it is believed that any angle α of less than 90° should provide the advantages of the present invention. The base chamber 30 and inner wall 52 reduce from a wider portion 32a to a narrower portion 32b. In a preferred embodiment, the fuel inlet 44 is located at the narrower portion 32b of the base chamber 30. The fuel inlet 44 is joined to the inner wall 52 by an arcuate annular wall portion 56. The orifice 46 is mounted in the inlet 44 to provide access for fuel into the base chamber 30.

As shown in FIG. 5, primary air, or combustion air, enters the base chamber 30 through a combustion air inlet 54. The combustion air inlet 54 is disposed about a periphery of the base chamber 30 such that incoming air (referenced by arrow "A" of FIG. 5) at least initially flows into the base chamber 30 in a direction from the wider portion 32a of the base chamber 30 toward a narrower portion 32b of the base chamber 30.

It should be appreciated that the proper relation of the combustion air inlet 54 to the larger and smaller frustoconical diameters of the base chamber 30, as well as a length of inner wall 52 and the depth of the base chamber 30, are important dimensional relationships which may be varied to achieve desired performance of the burner 14.

The venturi 50, having opposed relatively open ends 50a,50b, provides a passage (referenced by the letter "P" in FIG. 5) between the fuel inlet 44 and the air/fuel exit ports 48. The base chamber 30 surrounds the lower open end 50a of the venturi 50, while the upper open end 50b extends to the head chamber 36. Thus, the fuel and air mixture flows directly from the base chamber 30 and into the venturi 50 through the lower open end 50a. After flowing through the venturi 50 the fuel and air mixture exits the venturi 50 through the upper open end 50b and flows into the head chamber 36. In the preferred embodiment, the venturi 50 is integrally formed as part of the burner head base plate 42. However, the venturi 50 may be a separable element as disclosed in the alternate embodiment of FIG. 8 (reference number 146), and in other embodiments the venturi 50 may even be used to secure the burner head 34 to the burner base 28, as will be disclosed below in detail.

FIG. 5 discloses that the combustion air inlet 54 is formed by spacing the burner head 34 from the burner base 28. In this embodiment, the combustion air inlet 54 includes first and second peripheral flanges 58,60 to the extent that air for combustion flows between the two flanges 58,60, into the inlet 54, and into the wider portion 32a of the base chamber 30 (see arrows "A" of FIG. 5). The first peripheral flange 58 extends circumferentially outward from and below the air and fuel mixture exit ports 48 and above the combustion air inlet 54. The second peripheral flange 60 extends outwardly from a wider portion 32a of the base chamber 30 below the combustion air inlet 54.

Preferably, both the first and second peripheral flanges 58,60 have an upper surface that is disposed at a downward angle to the mounting surface 26 such that water and debris transfer downward and off of the respective flanges 58,60. In this configuration, the first and second peripheral flanges 58,60 assist in preventing cooking spills and precipitation from entering the base chamber 30 through the combustion air inlet 54. Additionally, the second peripheral flange 60 is shaped such that liquid on the mounting surface 26 is deterred from entering the combustion air inlet 54.

The second peripheral flange 60 provides a convenient structure for mounting the burner 14 to the mounting surface 26 of the grill 10 as shown in FIGS. 1 and 2. In the preferred embodiment, the underside 62 of the second peripheral flange 60 is fitted with threaded blind holes (not shown) for use with screws to attach to the mounting surface 26. However, numerous possibilities, including rivets, clips, clamps, locking slots, and dowels with retaining rings, etc., may be employed to secure the burner 14 to the mounting surface 26. Additionally, the burner base 28 may be secured to the mounting surface 26 from either the top or bottom of the burner base 28.

As disclosed in FIG. 5, an igniter 64 is mounted to the second peripheral flange 60 through an aperture 66 in the flange 60. A shoulder 64a of the igniter 64 rests on the second peripheral flange 60, securing the igniter 56 from downward movement. A retaining clip (not shown) mounted to a lower portion 64b of the igniter 64 prevents upward movement, thereby fixedly securing the igniter 64 to the second peripheral flange 60. In addition, the igniter 64 extends through an opening 68 in the first peripheral flange 58, such as to be exposed to the air and fuel mixture exit ports 48.

Fuel inlet 44 includes a mounting wall 70 and an opening 74. The mounting wall 70 is generally frustoconically-shaped and is advantageously joined to the inner wall 52 of the burner base 28 by a first arcuate annular wall portion 56. The mounting wall 70 forms an angle γ to the vertical as disclosed in FIG. 5. In the preferred embodiment, the angle γ of mounting wall 70 is 30°. However, it is believed that any angle less than 90° would be preferable according to the invention. An orifice 46 is mounted in the opening 74.

This design is believed to avoid unnecessary turbulence effecting the combustion air intake flow normally found in conventional cylindrical air and fuel mixing chambers. It is also believed that this configuration reduces resistance to fuel exiting the orifice 46 and may even enhance flow velocity of the air/fuel mix up the venturi 50.

It should be appreciated that the distance between the bottom open end 50*a* of the venturi 50 and the gas orifice 46 (shown as δ in FIG. 5) may be varied in any given embodiment to achieve desired flow and flame characteristics.

Although the fuel inlet 44 is preferably located at the narrower portion 32*b* of the base chamber 30, it is contemplated that fuel could be inlet at other positions along inner wall 52, including that one or more inlets 44 could be spaced about the inner wall 52. Alternatively, for example, a peripheral inlet ring slot (not shown) could be provided in the inner wall 52 and could be located between the wider portion 32*a* and the narrower portion 32*b*.

Additionally, as shown in FIG. 4, the burner 14 may include a drainage port 76 which extends through the inner wall 52 of the base chamber 30 to permit drainage of water and debris. This drainage port 76 is preferably located near the narrow portion 32*b* of the base chamber 30. Optionally, this drainage port 76 may be sized to provide additional primary air, in conjunction with the primary air which enters the base chamber 30 through the combustion air inlet 54.

The burner 14 further includes a means for securing the burner cap 38 to the burner head base plate 42 such that the burner cap 38 may be lifted off of the burner head base plate 42 for inspection and cleaning of the components of the burner head 34 and the headchamber 36 itself. FIGS. 4 and 5 disclose protrusions 78*a*,78*b* which extend from the burner cap 38. Receptacles 80*a*,80*b* on the burner head base plate 42 receive the protrusions 78*a*,78*b*. Each of the protrusions 78*a*,78*b* and receptacles 80*a*,80*b* are cooperatively dimensioned such that the burner cap 38 may be lifted off the burner head base plate 42, but such that the burner cap 38 will not separate from the burner head base plate 42 when undergoing an ANSI shake test for portable outdoor gas grills. In the embodiment disclosed, protrusions 78*a*,78*b* of approximately 0.875 inch long and approximately 0.1875 inch in diameter have been successfully used. However, it is believed that a minimum length of about 0.25 inch may be sufficient to accomplish the desired goal on most burners, such as burners 14. In other embodiments, the protrusions 78*a*,78*b* could extend from the burner head base plate 42, and the receptacles 80*a*,80*b* could be housed in the burner cap 38.

The burner cap 38 is preferably constructed of cast iron and is sized such that the burner cap 38 is of sufficient weight to assist in maintaining unity of elements of the burner head 34 during the ANSI shake test. Essentially, the weight of the burner cap 38 helps to retain the elements of the burner head 34 together, as well as air weighing down the burner head 34 on the burner base 28.

The gas burner 14 also includes a means for securing the burner head 34 to the burner base 28, such that the burner head 34 may be lifted off the burner base 28 for inspection and cleaning of the burner base 28 and the base chamber 30. FIGS. 4 and 5 disclose protrusions 82*a*,82*b*,82*c* which extend from the burner head base plate 42. Receptacles 84*a*,84*b*,84*c* on the burner base 28 receive respective protrusions 82*a*,82*b*,82*c*. Each of the protrusions 82*a*,82*b*,82*c* and receptacles 84*a*,84*b*,84*c* are cooperatively dimensioned such that the burner head 34 may be lifted off the burner base 28, but such that the burner head 34 will not separate from the burner base 28 when undergoing an ANSI shake test for portable outdoor gas grills. Protrusions 82*a*,82*b*,82*c* of approximately 0.875 inch long with a tapered diameter of approximately 0.1875 to 0.250 inch have been used successfully with corresponding receptacles 84*a*,84*b*,84*c*. However, it is believed that a minimum length for the protrusions 82*a*,82*b*,82*c* of about 0.25 inch may accomplish the desired goal. In other embodiments, the protrusions 82*a*,82*b*,82*c* could extend from the burner base 28, and the receptacles 84*a*,84*b*,84*c* could be housed in the burner head base plate 42. Additionally, the number of protrusions 82 and receptacles 84 can be varied.

FIG. 5 discloses a means for spacing the burner head 34 from the burner base 28 sufficient to leave a gap about a periphery of the burner 14 between the burner base 28 and the burner head 34. One such means includes spacers 86 formed integrally with protrusions 82. The spacers 86 have a length which prevents the burner head 34 from closing on the burner base 28 to sufficiently separate the burner head 34 from the burner base 28. The spacers 86 have a diameter greater than the inside diameter of the receptacles 84; thus, the spacers 86 do not enter the receptacles 84. Rather, spacers 86 rest on the surface surrounding the receptacles 84. It should be appreciated that spacing could also be provided by any number of other protrusions, lands, washers, lugs and the like used in conjunction with components of either the burner head 34 or the burner base 28, or both. Spacing the burner head 34 from the burner base 28 thus provides a construction which can be conveniently modified to increase or decrease the gap, and thus the air intake. Additional means for spacing the burner head 34 from the burner base 28 will be described in other embodiments herein.

As shown in FIG. 5, burner head 34 has a head chamber 36. Chamber 36 is generally defined by a lower surface of the cap 38, an upper surface of the burner head base plate 42, and a circumferential side wall defined by the removable ring 40. The ring 40 is interposed between the burner cap 38 and the burner head base plate 42.

Figure 6:
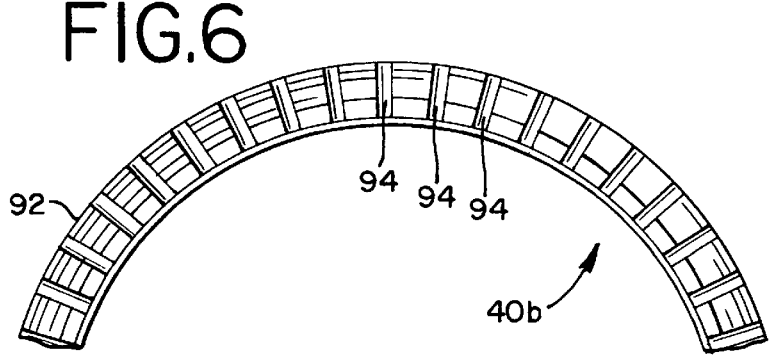
FIG. 6 is a fragmentary top view of an upper portion of a removable ring from the gas burner of FIG. 3.
Figure 7:
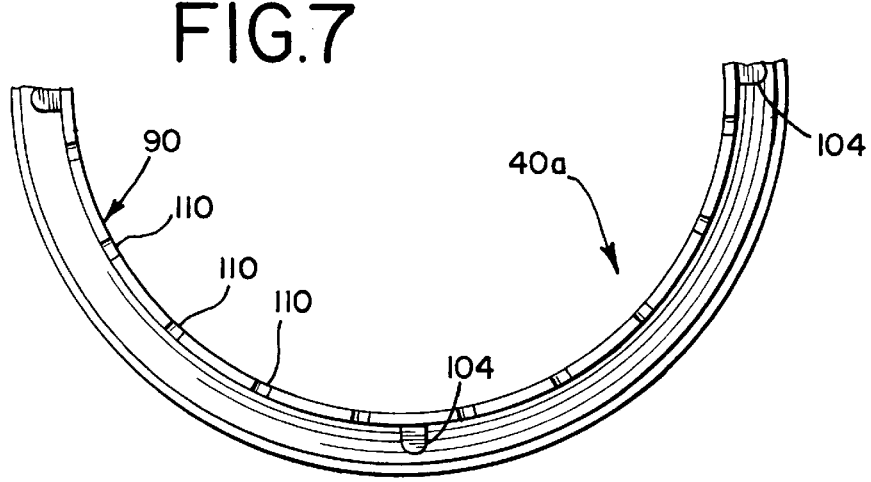
FIG. 7 is a fragmentary bottom view of a lower portion of the removable ring from the gas burner of FIG. 3.

As disclosed in FIGS. 6 and 7, the removable ring 40 has a circumferential lower and upper portion 40*a*,40*b*. The lower portion 40*a* is received in a base channel 88 formed on the burner head base plate 42. The upper portion 40*b* is shaped to permit the burner cap 38 to rest upon it. The lower portion 40*a* has a first periphery 90 and the upper portion 40*b* has a second periphery 92. The second periphery 92 is larger than the first periphery 90, such that the upper portion 40*b* overhangs an outer wall 88*a* of the base channel 88.

The upper portion 40*b* of the ring 40 includes flame channels 94 spaced about a periphery of the ring 40, the flame channels 94 extend through a thickness of the upper portion 40*b* of ring 40. The flame channels 94 are disposed at an upward angle. The channels 94 are open at the uppermost portion of upper portion 40*b* of the ring 40. The channels 94 are closed by cap 38 to form individual fuel exit ports 48. In particular, the burner cap 38 has an annular abutment 96 which extends from the lower surface of the burner cap 38. The abutment terminates, such as to present a frustoconical end surface 97. When the burner cap 38 is placed on the burner head 34, the surface 97 rests on the upper portion 40*b* of the ring 40. Upper portion 40*b* presents a mating frustoconical surface 40*c*. In this manner, the annular abutment 96 provides a surface 97 which encloses the upper-open side of the flame channels 94 and furthermore provides a structure to facilitate alignment of the cap 38.

Adjacent the annular abutment 96 is an angled surface 98 on the burner cap 38. The angle of the angled surface 98 is roughly equal to the angle of the flame channels 94. Thus, the angled surface 98 cooperates with the flame channels 94 to provide sufficient clearance and support for the primary flame.

Several flame channels 94 align with tines 100 of a trivet 102 (FIG. 2). Each of these flame channels 94 are reduced in size so as to restrict the volume of air/fuel mixture exiting from them. This is to prevent the aligned tines 100 from spreading a flame of the size which would otherwise be provided from standard size channels 94. As disclosed in FIG. 7, the ring 40 also includes tabs 104 formed on the lower portion 40a of the ring 40. These tabs 104 engage in corresponding apertures 106 in the base channel 88 to assure proper alignment of the ring 40 in the base channel 88 to match the reduced volume channels 94 with the location of the tines 100. As such, the reduced volume flame channels 94 align properly with the tines 100.

The lower portion 40a of the ring 40 provides a means for permitting a sufficient flow of fuel/air mixture to flow under the ring 40 to provide a pilot flame. A means includes that the lower portion 40a of the ring 40 is received in a base channel 88 formed on the burner head base plate 42. As disclosed in FIG. 7, the lower portion 40a of the ring 40 is dimensioned to provide a gap 108 (FIG. 5) between itself and the outer wall 88a and inner wall 88b of the base channel 88. The lower portion 40a also includes pilot channels 110 which extend through a thickness of the lower portion 40a and are alternated about the periphery of the lower portion 40a. In this manner, a sufficient flow of fuel and air mixture is permitted to flow into a gap 108, under the ring 40 and out of the base channel 88 to provide a circumferential pilot flame. As disclosed in FIG. 5, the second periphery 92 of the ring 40 overhangs outer wall 88a of the base channel 88 and provides an area between lower portion 40a and outer wall 88a for the air fuel mixture to collect.

As disclosed in FIGS. 4 and 5, the burner head base plate 42 has a central surface 112 which extends radially to a point proximate the flame channels 94. The central surface 112 of the burner head base plate 42 defines a lower extent of the head chamber 36. This central surface 112 is frustoconical in shape. However, it is also contemplated that this surface 112 could advantageously be convex or frustospherical in shape. Any of these shapes is-thought to enhance the performance of the flow of gas through the head chamber 36.

SECOND EMBODIMENT

Additional embodiments provide for modifications to the original embodiment described above. In such additional embodiments components are modified or added/subtracted to provide interchangeable features to an auxiliary gas burner.

Accordingly, FIGS. 8 and 9 disclose a sealed gas burner 200, as another embodiment of the present invention. The sealed gas burner 200 includes a burner base 202, a sealable burner head 204, and a venturi 206. A means for securing the burner head 204 to the burner base 202 is provided so that the burner head 204 may be lifted off the burner base 202 for inspection and cleaning of the components. A means is also provided for sealing the burner head 204 to the mounting surface 208. The sealed gas burner 200 may be used in accordance with gas grills, such as grill 10, or it may be used in other gas burner applications.

The sealable burner head 204 includes a burner cap 210, a removable ring 212, and a burner head base plate 214. A means is provided for securing the burner cap 210 to the burner head base plate 214 such that the burner cap 210 may also be lifted off the burner head base plate 214 to expose a head chamber 216 therein. As in the burner 10, the head chamber 216 is generally defined by a lower surface of the cap 210, an upper surface of the burner head base plate 214, and the removable ring 212 which is interposed between the burner cap 210 and the base plate 214. The ring 212 has a plurality of exit ports 218 for permitting a mixture of air and fuel to exit through the exit ports 218 to produce a primary heating flame.

The burner base 202 is comprised of a base chamber 220, an inner wall 222, a fuel inlet 224 and an orifice 226. As with burner 10, the inner wall 222 of the burner base 202 defines a substantially frustoconical base chamber 220. However, the inner wall 222 may also be concave or convex as shown in FIGS. 10 and 11, and described in detail below. Thus, the inner wall 222 of the burner base 202 provides a base chamber 220 which reduces from a wider portion 228a to a narrower portion 228b. The inner wall 222 preferably defines an angle α (see FIG. 8) to the vertical (referenced by line Y—Y of FIG. 8). The angle α is approximately 80° or less, however, it is believed that any angle α of less than 90° should provide enhanced burner 200 performance according to the present invention.

As disclosed in FIGS. 8 and 9, the fuel inlet 224 provides access for fuel into the venturi 206. The fuel inlet 224 extends through the inner wall 222 of the burner base 202, and an orifice 226 is mounted to the fuel inlet 224. Again, it is contemplated that there could be more than one fuel inlet 224 which could be located at any other location within the burner base 202, including at positions along the inner wall 222 of the base chamber 220.

As shown in FIGS. 8 and 9, a means for sealing the burner head 204 to the mounting surface 208 includes an external collar 232 of the burner head 204, an annular recess 234 within the external collar 232 and an O-ring gasket 236a positioned within the annular recess 234. The O-ring 236a is sized to deform into the recess 234 and to conform to the mounting surface 208 when the burner 200 is installed. A means for providing and maintaining a force sufficient to deform the gasket 236a into sealing relation with the mounting surface 208 is provided. By maintaining a sufficient compression force on the gasket 236a against the mounting surface 208, fluid is prevented from flowing under the sealable burner head 204 and into the area below the mounting surface 208. Additionally, by maintaining a sufficient compression force on the gasket 236a against the mounting surface 208, gas is prevented from transferring below the mounting surface 208. Compression of the O-ring 236a may be provided in a number of ways. However, in burner 200, the compression is provided by the downward force of collar 232 when the venturi 206 is screwed or locked into a fully closed position as shown in FIG. 8 and as will be discussed in more detail below.

As disclosed in FIG. 8, an igniter mounting flange 231 extends from a portion of collar 232. An igniter 238 is mounted in the flange 231 through an aperture 240 in the flange 232. A shoulder 238a of the igniter 238 rests on a surface of the flange 231, securing the igniter 238 from downward movement. A retaining clip (not shown) mounted to a lower portion 238b of the igniter 238 prevents upward movement of the igniter 238, thereby fixedly securing the igniter 238 to the flange 231. A mounting hole 242 extends through the mounting surface 208 such that the lower portion 238b of the igniter 238 projects into the area underneath the mounting surface 208 for electrical connection. An O-ring gasket 236b is placed within a seat 233 located at the lowermost portion of flange 231 and aperture 240. Thus, when the burner 200 is mounted the O-ring 236b is deformed against mounting surface 208 sealing the mounting hole 242 in the mounting surface 208.

As shown in FIGS. 8 and 9, the burner 200 includes a lip 244 and a circumferential side wall portion 246 for engaging the mounting surface 208. The circumferential side wall 246 has an outside diameter 246a which substantially matches the inside diameter 243a of the mounting hole 243 in the mounting surface 208. This permits the burner 200 to engage the mounting surface 208 to prevent movement of the sealable gas burner 200 in the plane of the mounting surface 208. The lip 244 abuts against an underside of the mounting surface 208 and provides a means for fixing the vertical position of the gas burner 200. The circumferential side wall 246 is part of the burner base 202 (FIG. 8). However in other embodiments, the circumferential side wall portion may be part of the burner head. For example, FIG. 9 discloses a wall portion 400 on burner head 204, which serves the above-described alignment functions.

Additionally, as shown in FIG. 9, a drip-lip 250 may be employed as part of the burner head base plate 241, located above the combustion air inlet 266, such as to prevent rainwater or boiled-over water from entering the base chamber 220 through a combustion air inlet 266.

As disclosed in FIGS. 8 and 9, a means for attaching the sealable burner head 204 to the burner base 202 includes an opening 252 in the burner head base plate 214. The venturi 206 fits into the opening 252 and is captured therein. An annular ridge 257 of venturi 206 cooperates with an annular abutment 254 in opening 252 to prevent the venturi 206 from sliding entirely through the opening 252. The venturi 206, however, is able to rotate within the opening 252.

The venturi 206 has two opposed relatively open ends 206a, 206b and an inner channel or passage 258 which extends from one end 206a of the venturi 206 to the other 206b. Upper open end 206b of the venturi 206 contains key slots 260 (opposing notches defining a key way in the wall of the venturi 206 which provides for rotational manipulation of the venturi 206). The slots 260 extend in a direction transverse to the axis of rotation of the venturi 206. A spanning tool (not shown) can be inserted in the slots 260 to rotate the venturi 206 in the opening 252. The lower open end 206a of the venturi 206 has a means for fixedly connecting the venturi 206 to the burner base 202. In the embodiment disclosed in FIG. 8 the means includes internal threads in the open end 206a of the venturi 206 and mating external threads on the projection 262 of the burner base 202. In the embodiment disclosed in FIG. 9 the means includes external threads in the open end 206a of the venturi 206 and mating internal threads on the projection 262 of the burner base 202. To secure the venturi 206 to the burner base 202 the venturi is threaded onto the projection 262 and tightened with a spanning tool. Optionally, a bayonet lock mechanism in place of the threads (not shown) may be employed to connect the venturi 206 to the burner base 202.

Once the sealable gas burner 200 is assembled, upper open end 206b of the venturi 206 opens into the head chamber 216 and while lower open end 206a of the venturi 206 opens into the base chamber via windows 268.

Thus, gas flows into the head chamber 216 by traversing through the passage 258 of the venturi 206.

As the venturi 206 is threaded or lock-twisted in, the burner head base plate 214 and the burner base 202 are drawn together. This permits cooperation of the collar 232, the flange 231 and O-rings 236a,236b to apply compressive pressure on the mounting surface 208 for sealing the burner 200.

The burner head base plate 214 also includes a cylindrical sidewall 264 which defines an upper portion of base chamber 220. The sidewall 264 has combustion air inlets 266 which allow air to enter the base chamber 220. The combustion air inlets 266 are disposed about a periphery of sidewall 264, and are located such that incoming air (referenced by arrows "A" of FIG. 8) at least initially flows into the base chamber 220 in a direction from a wider portion 228a of the base chamber 220 toward a narrower portion 228b of the base chamber 220.

In this embodiment, combustion air inlets 266 are in the form of slots integrally formed into the burner head base plate 214 as opposed to burner 14 where the air intake is provided by a gap between the burner head base plate 42 and the burner base 28 (FIG. 5). While many other constructions may be used to provide a combustion air inlet, an important feature of each should be that they provide for combustion air to at least initially flow into a base chamber (such as chambers 30, 220) in a direction from a wider portion (such as portions 32a, 228a of burner bases 28,220) toward a narrower portion of the chamber (such as portions 32b, 228b of the burner bases 28, 220). Ideally the air flow should converge to a central portion of the base chamber such as in base chambers 28, 220 of FIGS. 5 and 8, without being interrupted by other structures or areas in the base chamber in which there is little flow (i.e., dead zones) or in which flow is excessively turbulent.

The flow rate and volume of combustion air may be controlled according to the invention by any number of means, but preferably by either permanently or adjustably varying the size or number of inlets such as inlets 54, 266. For example the combustion air inlet 54 of burner 14 may be widened by increasing a thickness of the spacers 90 for additional air intake. Also, the combustion air inlets 266 of burner 200 can be formed to any desired size. The number of inlets 266 can be increased or reduced. The air intake can also be made variable such as by providing an adjustable slide ring (not shown) to vary the size of the combustion air inlets 266, thereby controlling the amount of flow of combustion air into the base chamber 220.

It will be appreciated by those of skill in the art that reduction of the air inlet size may also have the effect of increasing the rate or speed of air flow depending on the flow rate of fuel and the burn rate of the primary heating flame. Thus, the air intake ports, gaps, inlets, etc. should be sized as desired for the expected range of burner thermal output.

Another way to control combustion air flow is disclosed in FIGS. 8 and 9 on the venturi 206 of burner 200. The venturi 206 includes opposed windows 268 in its outer wall for flow of combustion air into the venturi 206. Combustion air thus flows through the combustion air inlets 266, into the base chamber 220, through the windows 268 in the venturi 206 and into the inner channel 258 of the venturi 206. Once in the inner channel 258 of the venturi 208, gas and combustion air flows into the head chamber 220 and out of the exit ports 218. The area of the opening of the windows 268 of the venturi 206 may be sized to regulate the volume of combustion air which flows from the base chamber 220 into the inner passage 258 of the venturi 206. In operation of any of the burners 14,200 disclosed, combustion air flows into the base chamber 30,220 along the tapered inner wall 52,222. This reduces turbulence which permits better flow of air to the fuel source and up the venturi 50,206. Additionally, this is believed to achieve most of the mixing of air and fuel in the direct path to, and inside of, the venturi 52,206. This flow pattern produces a strong and even flow which reduces the chances for ignition of fuel in the base chamber 30,220.

As in the previous embodiment, this sealable gas burner 200 further includes a means for securing the burner cap 210 to the burner head base plate 214 such that the burner cap 210 may be lifted off the burner head base plate 214 for inspection and cleaning of the burner head 204 and the head chamber 216. The sealable gas burner 200 also includes a means for securing the burner head 204 to the burner base 202 such that the burner head 204 may be lifted off the burner base 202 for access to the base chamber 220 for inspection and cleaning thereof. Regarding removal of the burner cap 210, protrusions 270a,270b extend from the burner cap 210, and receptacles 272a,272b on the burner head base plate 214 receive the protrusions 270a,270b. Regarding removal of the entire burner head 204, protrusions 274a,276b extend from the burner head base plate 214, and receptacles 276a,276b on the burner base 202 receive the protrusions 274a,274b.

In all of the embodiments disclosed, the head chamber (i.e. chambers 36 and 216) are relatively narrow in cross-section and volume with respect to the volume of venturi's. The distance between the lower surface of the burner cap 38,210 and the upper surface of the burner head base plate 42,214 is sufficiently small such that the overall smaller volume capacity of the head chamber 36,216 is believed to produce an acceleration of air and fuel mixture through the head chamber 36,216 and out of the exit ports 48,218. Because gas entering the head chamber 36,216 is accelerated out of the exit ports 48,218, this is believed to enhance the overall characteristics of primary flame and reduces the possibility of flashback of the flame which could lead to damage and ultimate failure of the internal components of the burners 14,200.

While the specific embodiments have been illustrated and described, numerous modifications come to mind without significantly departing from the spirit of the invention and the scope of protection is only limited by the scope of the accompanying Claims.

For example, FIGS. 10 and 11 disclose various modifications which may be made to the above embodiments. The fragmented embodiment of FIG. 10 discloses that the burner base 28 and burner head 34 may also be spaced wherein adjustment nuts or washers 300, which may or may not be integral with the protrusions 82, are used for spacing. Additionally, as disclosed in the fragmented embodiment of FIG. 11, spring clips 302 may be attached to the protrusions 82, either in a groove 303 or not, in order to maintain a proper cross section of primary air intake between the burner head base plate 42 and the burner base 28.

Alternatively, the burner head 34 may be secured to the burner base 28 by provision of a venturi 50 such as venturi 206 of burner 200 (not shown in the figures). As such, venturi 50 could have either internal or external threads on at least one end 50a which would mate with corresponding threads on fuel inlet 44 of the burner base 28 or mating portions of a bayonet twist type lock.

For added securement of the burner head 34 to the burner base 28, as disclosed in FIG. 11, one of the protrusions 82 of the burner 14 could extend beyond the base of the receptacles 84 such that a spring clip 304 could attach to the protrusion 82 to fix the protrusion 82 in the receptacle 84. In addition, a groove 306 could be placed proximate the end of the protrusion 82 for attachment of a spring clip 304.

Another means for securing the burner head 34 to the burner base 28, as disclosed in FIG. 10, includes having one of the receptacles 84 employing an opening 308 which would allow a spring clip 310 to pass through and connect to a groove 312 in mating protrusion 82, thereby fixing the protrusion 82 in the receptacle 84.

We claim:

1. A barbecue grill comprising:
    a grilling housing; and
    a gas burner mounted adjacent the grilling housing, the burner including:
        a fuel inlet;
        at least one air and fuel mixture exit port;
        a venturi having opposed relatively open ends, the venturi providing a passage between the fuel inlet and the air and fuel mixture exit ports;
        a chamber surrounding one of the open ends of the venturi, the chamber having an inner sloping wall that approaches a lower of the open ends of the venturi, the fuel inlet providing access for fuel into the chamber; and
        a combustion air inlet permitting combustion air into the chamber.

2. The barbecue grill of claim 1, wherein the combustion air inlet is disposed adjacent the wider portion of the chamber such that incoming air initially flows into the chamber in a direction from the wider portion of the chamber toward the narrower portion of the chamber.

3. The barbecue grill of claim 2, wherein the chamber is substantially frustoconical in shape, wherein a narrower portion of the frustoconical chamber is proximal a bottom open and of the venturi, and wherein a wider portion of the frustoconical chamber is distal the bottom open end of the venturi.

4. The barbecue grill of claim 1, wherein the chamber is substantially frustoconical in shape, wherein a narrower portion of the frustoconical chamber is proximal a bottom open end of the venturi, and wherein a wider portion of the frustoconical chamber is distal the bottom open end of the venturi.

5. The barbecue grill of claim 1, wherein the chamber having an inner wall which defines an angle to the vertical of less than 90°.

6. The barbecue grill of claim 5, wherein the fuel inlet is located adjacent the narrower portion of the chamber.

7. The barbecue grill of claim 1, wherein the fuel inlet is joined to an inner wall of the chamber by an arcuate annular wall portion.

8. The barbecue grill of claim 7, wherein the fuel inlet is adjacent the narrower portion of the chamber.

9. The barbecue grill of claim 1 including at least one opening in the chamber to permit drainage of water and debris.

10. The barbecue grill of claim 1, wherein the inner wall of the chamber is convex away from a center of the chamber.

11. The barbecue grill of claim 1, wherein the inner wall of the chamber is concave toward a center of the chamber.

12. The barbecue grill of claim 1 wherein the combustion air inlet permitting combustion air into the chamber is disposed about a periphery of the chamber.

13. The barbecue grill of claim 1 wherein the gas burner further including:
    a first peripheral flange extending circumferentially outward from and below the at least one air and fuel mixture exit port and above the combustion air inlet; and
    a second peripheral flange extending outwardly from a wider portion of the chamber below the combustion air inlet, a distal end of the first and second peripheral flanges extending angularly downward, the first and second peripheral flanges being cooperatively located and spaced such that air for combustion flows between the first and second flanges and into the combustion air inlet.

14. The barbecue grill of claim 13 further including an igniter mounted to the second flange and extending through an opening in the first flange such as to be exposed to the air and fuel mixture exit ports.

15. The barbecue grill of claim 14 including at least one opening in the chamber to permit drainage of water and debris.

16. The barbecue grill of claim 1, wherein the burner includes a means for sealing the burner head from the area below a mounting surface for the burner.

17. A barbecue grill comprising:
a grilling housing; and
a gas burner mounted adjacent the grilling housing, the burner including:
  a burner base having a base chamber with an open end;
  a burner head closing the open end of the base chamber, a burner head chamber within the burner head, the burner head chamber having an open end, the burner head chamber and the base chamber being in fluid communication;
  a cap closing the open end of the burner head chamber;
  a burner head base plate within the burner head; and
  means for securing the cap to the burner head such that the cap may be lifted off of the burner head for access to the burner head chamber, wherein the gas burner has a fuel inlet and an air inlet into the base chamber, wherein the fuel and air are mixed in the gas burner for combustion thereof, and wherein the gas burner further includes an air and fuel mixture exit port.

18. The barbecue grill of claim 17, wherein the means for securing the cap including:
at least one protrusion extending from one of either the burner head base plate or the cap; and
a receptacle on the other of the burner head base plate or cap for receiving the at least one protrusion.

19. The barbecue grill of claim 18, wherein the at least one protrusion and receptacle are cooperatively dimensioned such that the cap may be lifted off the burner head, but such that the cap will not separate from the burner head when undergoing an ANSI Z21.58 or Canada/CGA-1.6 shake test for portable outdoor gas grills.

20. The barbecue grill of claim 19, wherein the length of the at least one protrusion is at least 0.25 inch.

21. The barbecue grill of claim 17, wherein an upper extent of the burner head chamber being defined by a lower surface of the cap, a lower extent of the burner head chamber being at least in part defined by an upper surface of the burner head base plate, and a removable ring defining a circumferential side wall of the burner head chamber, the ring being interposed between the cap and the burner head base plate, and the ring having means for permitting fuel and air mixture to exit the burner head chamber to provide a primary heating flame.

22. The barbecue grill of claim 21, wherein the ring has an upper and a lower portion, the lower portion of the ring being received in a base channel formed on the burner head base plate, and including means for permitting a sufficient flow of fuel and air mixture to flow under the ring and out of the base channel to provide a pilot flame.

23. The barbecue grill of claim 22, wherein the means for permitting air and fuel flow under the ring including:
the lower portion of the ring being dimensioned to provide a gap between itself and an outer wall and an inner wall of the base channel; and,
pilot channels extending through a thickness of the lower portion of the ring, the pilot channels being alternated about a periphery of the lower portion of the ring.

24. The barbecue grill of claim 22, wherein the lower portion of the ring has a first periphery and the upper portion of the ring has a second periphery, the second periphery having a larger outside diameter than the first, such that the upper portion of the ring overhangs an outer wall of the base channel.

25. The barbecue grill of claim 21, wherein the means for permitting fuel and air mixture to exit through the ring to provide a primary heating flame including at least one flame channel spaced about a periphery of the ring and extending through a thickness of the ring.

26. The barbecue grill of claim 25, wherein the flame channels are disposed at an upward angle of less than 90° to the vertical.

27. The barbecue grill of claim 26, wherein the flame channels are open to an upper portion of the ring and are closed by the cap, the cap having an angled surface cooperating with the angle of the flame channels to provide a uniformly angled fuel and air mixture exit port.

28. The barbecue grill of claim 21, further including a first peripheral flange extending outwardly from the burner head and being located below the removable ring.

29. The barbecue grill of claim 28, wherein the first peripheral flange has at least a surface thereof disposed at a downward angle sufficient to shed water and debris downward and off of the first flange.

30. The barbecue grill of claim 28, further including a second peripheral flange extending outwardly from the burner base, the first and second peripheral flanges being cooperatively located such that air for combustion flows between the two flanges and into the base chamber.

31. The barbecue grill of claim 30, wherein both the first and second flanges having at least an upper surface thereof disposed at a downward angle.

32. The barbecue grill of claim 30, further including an igniter mounted on the second flange, the igniter extending through an opening in the first peripheral flange such as to be exposed to the air and fuel mixture exit ports.

33. The barbecue grill of claim 21, further including a means for spacing the burner head from the burner base sufficient to leave a gap about at least a portion of a periphery of the burner and between the burner base and the burner head for the inlet of combustion air into the base chamber.

34. The barbecue grill of claim 33, further including a first peripheral flange extending outwardly from the burner head and being located below the removable ring.

35. The barbecue grill of claim 34, wherein the first peripheral flange has at least an upper surface thereof disposed at a downward angle.

36. The barbecue grill of claim 34, further including a second peripheral flange extending outwardly from the burner base, and the first and second peripheral flanges being cooperatively located such that air for combustion flows between the first and second flanges and into the base chamber.

37. The barbecue grill of claim 36, wherein both the first and second flanges have at least an upper surface thereof disposed at a downward angle.

38. The barbecue grill of claim 33, wherein the means for spacing the burner head from the burner base includes a spacer disposed between the burner head and the burner base.

39. The barbecue grill of claim 17, further including a means for spacing the burner head from the burner base sufficient to leave a gap about a least a portion of a periphery of the burner and between the burner base and the burner head for the inlet of combustion air into the base chamber.

40. The barbecue grill of claim 39, wherein the means for spacing the burner head from the burner base includes a spacer disposed between the burner head and the burner base.

41. The barbecue grill of claim 17, wherein the burner head base plate has a frustoconical central portion.

42. The barbecue grill of claim 17, wherein the burner head base plate has a frustospherical convex central portion.

43. A barbecue grill comprising:
a grilling housing; and
a gas burner mounted adjacent the grilling housing, the burner including:
a burner base having a base chamber with an open end;
a burner head closing the open end of the base chamber;
a burner head base plate in the burner head;
at least one protrusion extending from one of either the burner head base plate or the burner base; and,
a receptacle on the other of the burner head base plate or burner base for receiving the protrusion, wherein the gas burner has a fuel inlet, and an air inlet wherein the fuel and air are mixed in the gas burner for combustion thereof, and wherein the gas burner further includes an air and fuel mixture exit port.

44. The barbecue grill of claim 43, wherein the at least one protrusion and receptacle are cooperatively dimensioned such that the burner head may be lifted off of the burner base, but such that the burner head will not separate from the burner base when undergoing an ANSI Z21.58 or Canada/CGA-1.6 shake test for portable outdoor gas grills.

45. The barbecue grill of claim 44, wherein the length of the at least one protrusion is at least 0.25 inch.

46. The barbecue grill of claim 43, including a spacer on the protrusion, the spacer having a length that will prevent the burner head from closing on the burner base such as to leave a gap about at least a portion of a periphery of the burner and between the burner base and the burner head for the inlet of combustion air into the base chamber.

47. The barbecue grill of claim 43, wherein at least one receptacle includes an opening to allow a spring clip to pass through and attach to the protrusion.

48. The barbecue grill of claim 43, wherein a protrusion extends through and beyond the receptacle such that a spring clip can attach adjacent an end of the protrusion.

49. A barbecue grill comprising:
a grilling housing; and
a gas burner mounted adjacent the grilling housing, the burner including:
a burner base having a base chamber;
a burner head on the burner base, the burner head having at least one air and fuel mixture exit port;
a venturi having opposed relatively open ends, the venturi providing a passage between the burner base and the burner head;
means for securing the burner head to the burner base such that the burner head may be lifted off of the burner base;
the base chamber surrounding one of the opposed relatively open ends of the venturi, the base chamber having an inner sloping wall that approaches a lower of the open ends of the venturi;
a fuel inlet connected to the base chamber, the fuel inlet providing access for fuel into the base chamber; and
a combustion air inlet disposed about at least a portion of a periphery of the wider portion of the base chamber.

50. The barbecue grill of claim 49, wherein the means for securing the burner head to the burner base including:
means to secure a first of the opposing ends of the venturi to the burner head; and,
threads on a second of the opposing ends of the venturi mating with threads on the inner wall of the base chamber whereby the venturi is threadedly connected to the burner base.

51. The barbecue grill of claim 49, wherein the means for securing the burner head to the burner base including:
means to secure a first of the opposing ends of the venturi to the burner head; and,
a bayonet on a second of the opposing ends of the venturi mating with a bayonet receiver on the inner wall of the base chamber whereby the venturi is removably connected to the burner base.

52. The barbecue grill of claim 49, wherein the base chamber is substantially frustoconical in shape, wherein a narrower portion of the frustoconical chamber is proximal a bottom open end of the venturi, and wherein a wider portion of the frustoconical chamber is distal the bottom open end of the venturi, and the wider portion of the base chamber is disposed adjacent the combustion air inlet such that incoming air initially flows into the base chamber in a direction from the wider portion of the base chamber toward a narrower portion of the base chamber.

53. The barbecue grill of claim 49, wherein the fuel inlet is adjacent the narrower portion of the chamber and the fuel inlet is joined to the inner wall of the chamber by an arcuate annular wall portion.

54. The barbecue grill of claim 49, wherein the combustion air inlet includes:
a first peripheral flange extending circumferentially outward from and below the at least one air and fuel mixture exit port and above the combustion air inlet; and
a second peripheral flange extending outwardly from a wider portion of the chamber below the combustion air inlet, a distal end of the first and second peripheral flanges extending angularly downward, the first and second peripheral flanges being cooperatively located and spaced such that air for combustion flows between the first and second flanges and into the combustion air inlet.

55. The barbecue grill of claim 54, wherein both the first and second peripheral flanges have an upper surface thereof disposed at a downward angle.

56. The barbecue grill of claim 55, further including an igniter mounted to the second flange, the igniter extending through an opening in the first flange such as to be exposed to the air and fuel mixture exit ports.

57. The barbecue grill of claim 49, wherein the burner head further comprises:
a head chamber within the burner head, the head chamber having an open end;
a cap closing the open end of the head chamber;
a burner head base plate mounted below the cap; and
a means for securing the cap to the burner head base plate such that the cap may be lifted off the burner head base plate.

58. The barbecue grill of claim 57, wherein an upper extent of the head chamber being defined by a lower surface of the cap, a lower extent of the head chamber being at least in part defined by an upper surface of the burner head base plate, and a removable ring defining a circumferential side wall of the head chamber, the ring being interposed between the cap and the burner head base plate, and the ring having a means for permitting fuel and air mixture to exit the head chamber to provide a primary heating flame.

59. The barbecue grill of claim 58 wherein the ring has an upper and a lower portion, the lower portion of the ring being received in a base channel formed on the burner head base plate, and including means for permitting a sufficient flow of fuel and air mixture to flow under the ring and out of the base channel to provide a pilot flame.

* * * * *